(12) United States Patent
Li et al.

(10) Patent No.: US 7,523,017 B2
(45) Date of Patent: Apr. 21, 2009

(54) WORKPIECE ASSESSMENT SYSTEM AND METHOD FOR USING THE SAME

(75) Inventors: Lei Li, Shenzhen (CN); Ping Chen, Shenzhen (CN); Pei-Qi Li, Shenzhen (CN); Zhi-Li Chen, Shenzhen (CN); Yun-Fang Zhao, Shenzhen (CN); Hong-Yu Pan, Shenzhen (CN)

(73) Assignees: ShenZhen Fataihong Precision Industry Co., ltd., ShenZhen, Guangdong Province (CN); Sutech Trading Limited, Tortola (VG)

( * ) Notice: Subject to any disclaimer, the term of this patent is extended or adjusted under 35 U.S.C. 154(b) by 0 days.

(21) Appl. No.: 11/755,651

(22) Filed: May 30, 2007

(65) Prior Publication Data

US 2008/0162434 A1 Jul. 3, 2008

(30) Foreign Application Priority Data

Dec. 29, 2006 (CN) .................... 2006 1 0064607

(51) Int. Cl.
G06F 11/00 (2006.01)
G06F 17/00 (2006.01)
(52) U.S. Cl. ........................................ 702/188; 707/3

(58) Field of Classification Search ................. 702/155, 702/188; 700/97, 108, 121; 707/3
See application file for complete search history.

(56) References Cited

U.S. PATENT DOCUMENTS

| 7,133,803 | B2 * | 11/2006 | Kappel ........................ 702/155 |
| 2005/0015223 | A1 * | 1/2005 | Huang et al. .................... 703/1 |
| 2006/0122727 | A1 * | 6/2006 | Chang et al. ................. 700/194 |

\* cited by examiner

*Primary Examiner*—Bryan Bui
(74) *Attorney, Agent, or Firm*—Steven M. Reiss

(57) ABSTRACT

An assessment system (100) used to creating an assessment of workpieces includes a database module (40), a connecting module (20), and a server module (30). The database module stores computer aided design (CAD) drawings of the checked workpieces. The database module and the server module are connected to each other via the connecting module. The server module is connected to the database module and includes an inquiry module and a processor module. The inquiry module inquires the CAD drawings of each checked workpiece and acquires relational parameters of the checked workpieces from the CAD drawings. The processor module processes the parameters acquired by the inquiry module, and the server module creates an assessment according to the parameters and data processed by the processor module.

13 Claims, 3 Drawing Sheets

WORKPIECE ASSESSMENT SYSTEM AND METHOD FOR USING THE SAME

BACKGROUND OF THE INVENTION

1. Field of the Invention

The present invention relates to reporting systems and, particularly, to a reporting system using computer aided design (CAD) drawings and a method for using the same to create an assessment/report.

2. Description of Related Art

In a manufacturing corporation, a large number of workpieces are widely used. These workpieces require to be regularly assessed for quality. Assessments in a special format need to be created in each checking process to record checking data of/for the workpieces.

During creation of a workpiece assessment, parameters such as name, material, shape, and/or dimension are recorded. Relational data such as limits, averages and tolerances are then calculated according to these parameters and are also recorded. Generally, these parameters and data calculated from the parameters have to be inputted manually into a computer to be recorded and processed to create an assessment, which may lead to mistakes being made.

Therefore, a new assessment creation system and a new assessment creation method are desired in order to overcome the above-described shortcomings.

SUMMARY

In one aspect, an assessment system used to create workpiece assessments includes a database module, a connecting module, and a server module. The database module stores CAD drawings of the checked workpieces. The database module and the server module are connected to each other via the connecting module. The server module is connected to the database module and includes an inquiry module and a processor module. The inquiry module examines the CAD drawings of each workpiece and acquires parameters of/for the workpieces from the CAD drawings. The processor module processes the parameters acquired by the inquiry module, and the server module creates an assessment according to the parameters and data processed by the processor module.

In another aspect, a method for creating an assessment of workpieces includes these steps: providing an assessment system, the assessment system including a database module and a server module, the database module storing CAD drawings of the checked workpieces, the server module being connected to the database module; inquiring about CAD drawings stored in the database module regarding each checked workpiece and acquiring relational parameters from the CAD drawings; processing the parameters; and creating and outputting a workpiece assessment, the workpiece assessment being created according to the processed parameters.

Other advantages and novel features will become more apparent from the following detailed description when taken in conjunction with the accompanying drawings.

BRIEF DESCRIPTION OF THE DRAWINGS

Many aspects of the present assessment system and method can be better understood with reference to the following drawings. The components in the various drawings are not necessarily drawn to scale, the emphasis instead being placed upon clearly illustrating the principles of the present assessment system and method. Moreover, in the drawings, like reference numerals designate corresponding parts throughout the diagrams.

DETAILED DESCRIPTION OF THE INVENTION

Figure 1:
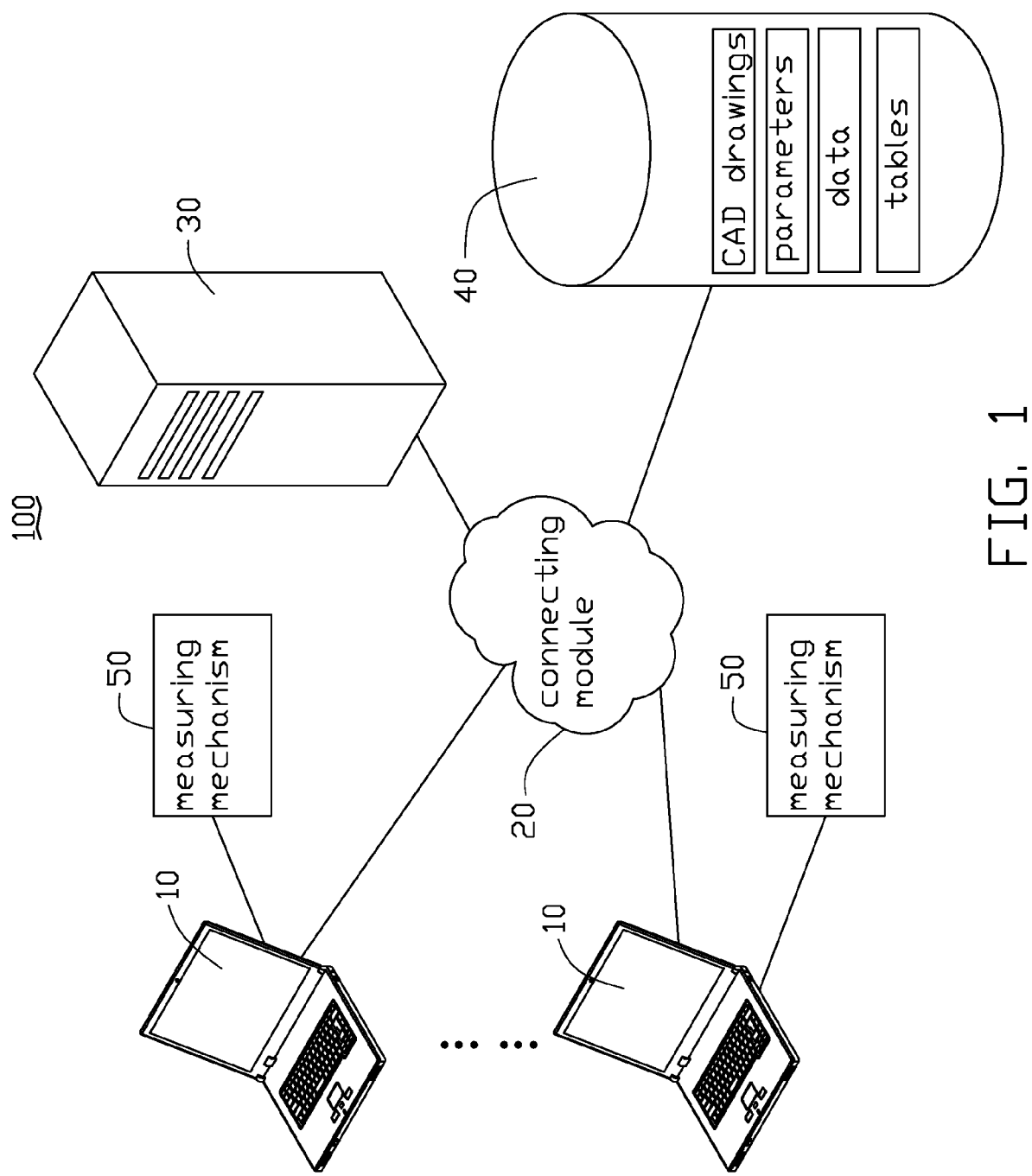
FIG. 1 is a schematic view of an assessment system, in accordance with a present embodiment.

Referring now to the detail, FIG. 1 shows an assessment system 100 in accordance with a present embodiment. The assessment system 100 is used to create workpiece assessments and includes a plurality of client computers 10, a connecting module 20, a server module 30, a database module 40 and a plurality of measuring mechanisms 50. The client computers 10 and the database module 40 are all connected to the server module 30, via the connecting module 20. Each measuring mechanism 50 is connected to a corresponding client computer 10.

Each client computer 10 can be, for example, a personal computer (PC), a remote mainframe computer, a machine-control computer, etc. The connecting module 20 can be, for example, an intranet used to connect the client computers 10 and the database module 40 to the server module 30; an internet system used to connect the client computers 10 and the database module 40 to the server module 30 remotely; etc. Likewise, the connecting module 20 can provide a hard-wired or wireless link/coupling and still be within the scope of the present system. The server module 30 is a computer used to examine relational parameters and data and to create workpiece assessments based on such. The database module 40 is used to store CAD drawings. Relational parameters, such as name, serial number, manufacturing date, specifications, shape, dimension, and relational data, such as limits and averages calculated according to the aforementioned parameters of each workpiece, require checking to create the assessments. The measuring mechanisms 50 can be, e.g., multimeters, dynamometers, sensors, image sensing modules, or combination of some or all of the aforementioned apparatuses used to measure other parameters of the workpieces, and the measuring mechanisms 50 can be manipulated via the client computers 10.

Figure 2:
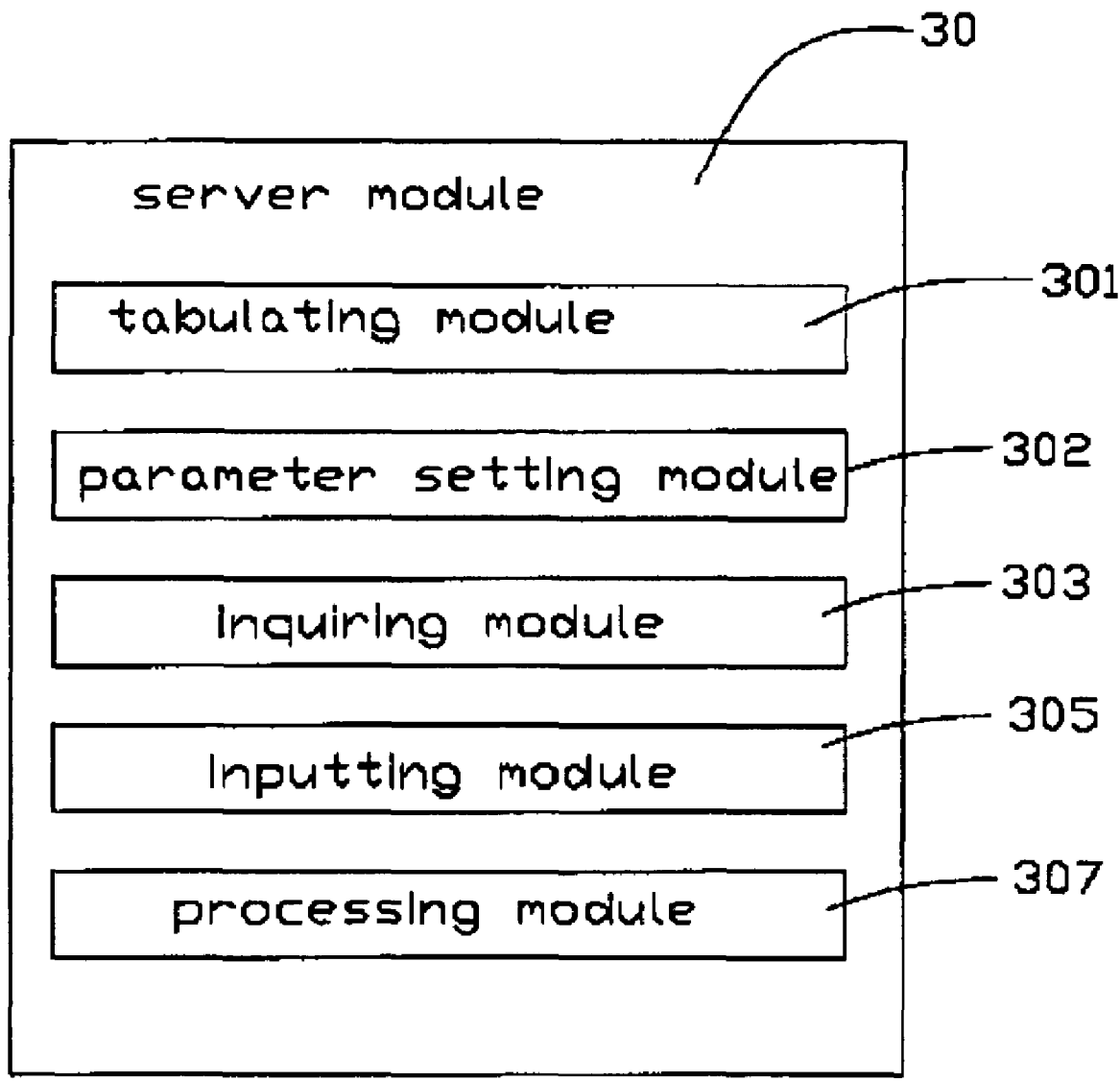
FIG. 2 is a diagram of a server module of the assessment system shown in FIG. 1.

Referring to FIG. 2, the server module 30 includes a tabulating module 301, a parameter-setting module 302, an inquiry module 303, an inputting module 305, and a processor module 307. The tabulating module 301 is used to create tabulated data sets of the workpiece assessments in a special format. The parameter setting module 302 is used to set predetermined ranges of relational parameters, data and differences between parameters of a same kind. The inquiry module 303 is used to examine relational parameters in CAD drawings of the workpieces. The inputting module 305 is used to input the parameters of the workpieces that are measured by the measuring mechanisms 50 or acquired by the inquiry module 303 into the tabulated data sets created by the tabulating module 301 to create tabulated data.

The processor module 307 is used to process the parameters and/or data and to mark or cancel the parameters and data that exceed the predetermined ranges set via the parameter setting module 302. Additionally, the processor module 307 has a correcting function. As such, when a plurality of workpieces are judged to have some parameters overly similar to those of a previously measured workpiece so as to differences between these parameters are smaller than an acceptable range, the processor module 307 can alert the operators to check the parameters and prevent workpieces being checked more than once.

Figure 3:
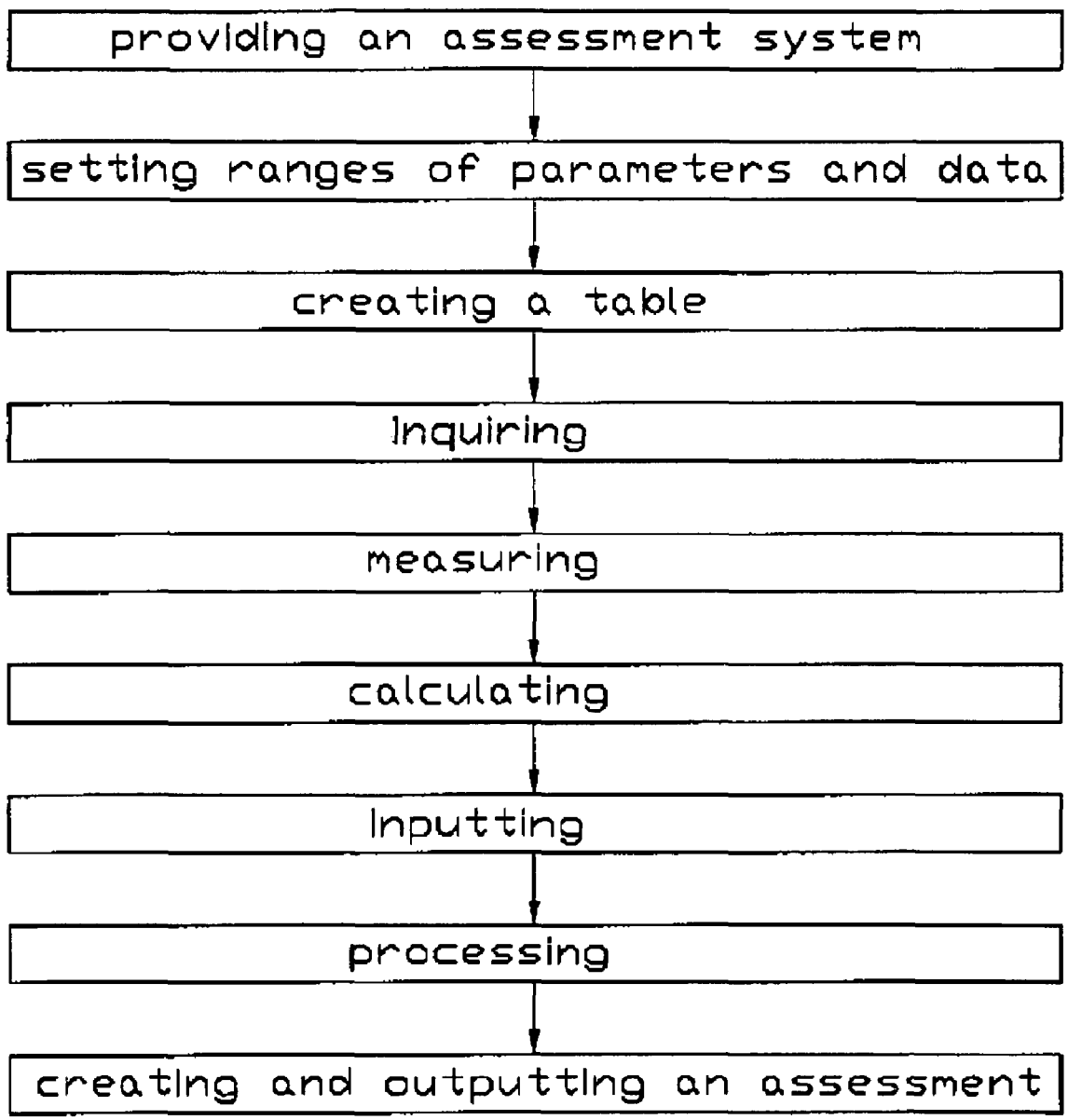
FIG. 3 is a flow chart of a report creating method, in accordance with a present embodiment.

Referring to FIG. 3, a method in accordance with a present embodiment for assessing workpieces is provided. The method includes these steps as follows:

providing an assessment system 100, wherein CAD drawings of the checked workpieces are stored in the database module 40 of the assessment system 100;

setting predetermined acceptable ranges of relational parameters and data of each workpiece and acceptable ranges of differences between parameters of a same kind of all checked workpieces via the parameter setting module 302;

creating a tabulated data set using the tabulating module 301, the tabulated data set being saved into the database module 40;

using the inquiry module 303 to examine CAD drawings stored in the database module 40 of each checked workpiece and to acquire relational parameters, such as shapes and dimensions, from the CAD drawings;

using the measuring mechanisms 50 to measure relational parameters that cannot be acquired from the drawings, such as mechanical parameters (e.g., elastic modulus, strength, toughness, etc.) and electrical parameters (e.g., resistance, capacitance, dielectric loss, etc.) of the checked workpieces;

calculating relational data such as limits, averages and tolerances according to the parameters by employing the processor module 307;

inputting, via the inputting module 305, the parameters and data to fill the tabulated data set;

processing the parameters and data with the processor module 307, comparing the parameters and data with the predetermined ranges set via the parameter setting module 302, and marking or canceling parameters and data that exceed the predetermined ranges in the tabulated data set;

determining if a plurality of workpieces are judged to have some parameters of a same kind that are overly similar to those of at least one previously measured workpiece so that when differences between these parameters are smaller than the predetermined ranges set via the parameter setting module 302, the processor module 307 alerts the operators to check the parameters to prevent workpieces being checked and measured more than once; and after the tabulated data set is filled, and after the parameters and data that exceed the predetermined ranges are highlighted or cancelled, then creating and outputting a workpiece assessment to the user by, for example, computer printout, computer display, etc.

Understandably, the reporting creating system 100 and the aforementioned reporting creating method can create workpiece assessments automatically and prevent mistakes typically created/made by manually inputting parameters and data. In this way, the accuracy and dependability of the assessment is improved.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. An assessment system used for assessing a plurality of checked workpieces, comprising:
   a database module configured for storing computer aided design (CAD) drawings of the checked workpieces;
   a server module including an inquiry module, a parameter setting module and a processor module, the inquiry module being configured for examining the CAD drawings of each checked workpiece and for acquiring shape and dimension parameters of the checked workpieces from the CAD drawings, the processor module being configured for processing the parameters acquired by the inquiry module to calculate assessment data of the workpieces according to the parameters, the parameter setting module being configured for setting ranges for at least one of the parameters, data, and differences between parameters of a same kind, and the server module being configured for creating an assessment according to the parameters and data processed by the processor module; and
   a connecting module coupled to both the database module and the server module, the database module and the server module thereby being linked with each other via the connecting module.

2. The assessment system as claimed in claim 1, wherein the assessment system includes at least one client computer connected to the database module and the server module via the connecting module.

3. The assessment system as claimed in claim 2, wherein the assessment system includes at least one measuring mechanism connected to the client computer, and the measuring mechanism is manipulated via the client computer to measure mechanical and electrical parameters of the checked workpieces.

4. The assessment system as claimed in claim 1, wherein the server module includes a tabulating module configured for creating tabulated data.

5. The assessment system as claimed in claim 1, wherein the server module includes an inputting module, the inputting module being configured for inputting at least one of the parameters and the data into the tables created by the tabulating module to fill the tables.

6. The assessment system as claimed in claim 5, wherein the processor module is configured for comparing the at least one of the parameters and the data with the predetermined ranges set via the parameter setting module and for at least one of marking and cancelling parameters and data that exceed the predetermined ranges in the table.

7. The assessment system as claimed in claim 1, wherein, when a plurality of workpieces are judged to have some parameters overly similar to those of a previously measured workpiece so as to differences between these parameters are smaller than acceptable tolerances, the processor module is configured so as to trigger an alarm.

8. A report creating method for assessing workpieces, comprising these steps:
   providing an assessment system, the assessment system including a database module and a server module, the database module storing CAD drawings of the checked workpieces, the server module being connected to the database module;
   examining CAD drawings of each workpiece stored in the database module and acquiring shape and dimension parameters of each workpiece from the CAD drawings;

processing the parameters to calculate assessment data of the workpieces according to the parameters;

setting acceptable ranges of the parameters and data of the checked workpieces, and parameter and dada that exceed the predetermined ranges being at least one of marked and canceled; and creating and outputting a workpiece assessment according to the parameters and data.

9. The method as claimed in claim 8, further comprising a step of measuring mechanical and electrical parameters of the workpieces using at least one measuring mechanism.

10. The method as claimed in claim 8, further comprising a step of calculating assessment data of the workpieces according to the shape and dimensional parameters acquired from the CAD drawings and the mechanical and electrical parameters measured by the measuring mechanism.

11. The method as claimed in claim 8, further comprising a step of creating a tabulated data set in a special format and saving the table into the database module.

12. The method as claimed in claim 11, further comprising a step of inputting the parameters and at least one set of data to complete the tabulated data.

13. The method as claimed in claim 8, further comprising a step of setting acceptable ranges of differences between parameters of a same kind of the checked workpieces and a step of triggering an alarm when a plurality of workpieces being measured to have at least some parameters similar to each ocher in a manner such that differences between these parameters are smaller than the ranges.

* * * * *